(12) United States Patent
Ichikawa et al.

(10) Patent No.: US 6,833,400 B2
(45) Date of Patent: Dec. 21, 2004

(54) GOLF BALL

(75) Inventors: Yasushi Ichikawa, Saitama (JP); Rinya Takesue, Saitama (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/139,518

(22) Filed: May 7, 2002

(65) Prior Publication Data
US 2003/0069087 A1 Apr. 10, 2003

(30) Foreign Application Priority Data

May 17, 2001 (JP) .......................................... 2001-148038

(51) Int. Cl.$^7$ ............................. A63B 37/12; C08K 5/20
(52) U.S. Cl. ...................... 524/227; 524/230; 524/318; 524/487; 524/490; 473/378
(58) Field of Search ............................... 524/227, 230, 524/318, 487, 490; 473/378

(56) References Cited

U.S. PATENT DOCUMENTS 4,674,751 A * 6/1987 Molitor et al. .............. 473/385
5,936,018 A * 8/1999 Muller et al. ................ 524/318
6,193,617 B1 * 2/2001 Mertens ....................... 473/351

FOREIGN PATENT DOCUMENTS

| JP | 09271538 A | 10/1997 |
| JP | 11178949 A | 7/1999 |

OTHER PUBLICATIONS

Encyclopedia of Polymer Science and Engineering vol. 17 p. 792–793.*

* cited by examiner

*Primary Examiner*—David J. Buttner
(74) *Attorney, Agent, or Firm*—Sughrue Mion, PLLC

(57) ABSTRACT

Disclosed is a golf ball having a cover formed from a thermoplastic polyurethane material exhibiting excellent mold releasability, despite the cover having dimples thereon and being difficult to remove from a mold. The cover material contains a thermoplastic polyurethane material as a primary component and a fatty acid amide and/or a montan wax serving as dispersants.

4 Claims, No Drawings

GOLF BALL

BACKGROUND OF THE INVENTION

1. Field of the Invention

The present invention relates to a golf ball having a cover formed from a thermoplastic polyurethane material; and more particularly to a golf ball having a cover formed through molding from a thermoplastic polyurethane material exhibiting excellent mold releasability.

2. Description of the Related Art

In recent years, polyurethane materials have become of interest as materials for forming a golf ball cover. Polyurethane materials are classified broadly into thermosetting polyurethane materials and thermoplastic polyurethane materials, and a process for forming a thermosetting polyurethane material into a product differs from a process for forming a thermoplastic polyurethane material into a product. A thermosetting polyurethane material can be formed into a product through the following procedure: a urethane prepolymer having an isocyanate end group and a curing agent such as polyol or polyamine, which serve as liquid raw materials, are mixed under heating; and the resultant mixture is fed directly to a mold and then heated, to thereby allow urethane curing reaction to proceed.

Many studies have heretofore focused on golf balls formed from thermosetting polyurethane materials. For example, U.S. Pat. Nos. 5,334,673, 6,117,024, and 6,190,268 disclose such golf balls. Meanwhile, U.S. Pat. Nos. 5,006,297, 5,733,428, 5,888,437, 5,897,884, and 5,947,843, among others, disclose forming methods of thermosetting polyurethane materials.

Since a thermosetting polyurethane material exhibits no thermoplasticity, the material and a product formed from the material cannot be recycled. In addition, when a thermosetting polyurethane material is employed for forming a specific product such as a golf ball cover (i.e., a product which covers a core), efficient production of the product is not attained, since the heating-curing step and the cooling step of the material requires long time, and high reactivity under heat and instability of the material make control of the molding time very difficult.

In the case where a thermoplastic polyurethane material is formed into a molded product, the product is not directly obtained through reaction of raw materials, but is formed from a linear polyurethane material—an intermediate—which has been synthesized by employment of raw materials and a synthesis method, the raw materials and the method differing from those employed in the case of the aforementioned thermosetting polyurethane material. Such a linear polyurethane material exhibits thermoplasticity, and is cured through cooling. Therefore, such a polyurethane material can be molded by use of an injection molding machine. Injection molding of a thermoplastic polyurethane material is a technique best suited for forming a golf ball cover, since the molding time of a thermoplastic polyurethane material is much shorter than that of a thermosetting polyurethane material, and a thermoplastic polyurethane material is suitable for precise molding. Meanwhile, a thermoplastic polyurethane material can be recycled, and is thus environmentally friendly. U.S. Pat. Nos. 3,395,109, 4,248,432, and 4,442,282, among others, disclose golf balls formed from thermoplastic polyurethane materials.

However, golf ball covers formed from conventional thermoplastic polyurethane materials exhibit poor mold releasability during molding. In order to cope with such a problem, Japanese Patent Application Laid-Open (kokai) No. 9-271538 discloses, in the Examples and Comparative Examples, use of magnesium stearate as a dispersant which is added to a resin during coloring of the resin; and Japanese Patent Application Laid-Open (kokai) No. 11-178949 discloses, in the Examples and Comparative Examples, use of polyethylene wax as a dispersant which is added to a resin during coloring of the resin. Although a stearic acid metallic salt advantageously improves mold releasability, the metallic salt conceivably serves as a catalyst for decomposing a thermoplastic polyurethane material, and therefore, when the stearic acid metallic salt has been employed as a dispersant, considerable lowering of the heat resistance of the thermoplastic polyurethane material has been observed. Meanwhile, when polyethylene wax, exhibiting poor compatibility with a thermoplastic polyurethane material, has been employed as a dispersant, tendency of lowered dispersibility of pigments has been acknowledged.

SUMMARY OF THE INVENTION

In view of the foregoing, an object of the present invention is to provide a golf ball including a cover—having dimples thereon and being difficult to remove from a mold—which is formed from a thermoplastic polyurethane material exhibiting excellent mold releasability.

In order to achieve the above object, the present invention provides the following golf balls.

(1) A golf ball comprising a core and a cover therefor, wherein the cover is formed from a cover material containing a thermoplastic polyurethane material as a primary component and a fatty acid amide and/or a montan wax serving as dispersants.

(2) A golf ball according to (1), wherein the fatty acid amide is an alkylene bis(fatty acid amide).

(3) A golf ball according to (2), wherein the fatty acid amide is ethylene bis(stearamide).

(4) A golf ball according to any one of (1) through (3), wherein the montan wax is a montanic acid ester.

(5) A golf ball according to any one of (1) through (4), wherein the ratio by weight of the thermoplastic polyurethane material to the total amount of the fatty acid amide and the montan wax is 100:0.2 to 100:3.

(6) A golf ball according to any one of (1) through (5), wherein the cover material further contains, as a dispersant, a polyethylene wax having an average molecular weight of 1,000 to 10,000.

(7) A golf ball according to (6), wherein the ratio by weight of the thermoplastic polyurethane material to the total amount of the fatty acid amide, the montan wax, and the polyethylene wax is 100:0.2 to 100:3.0.

DESCRIPTION OF THE INVENTION AND PREFERRED EMBODIMENTS

The present invention will next be described in more detail. Firstly, the thermoplastic polyurethane material will be described. The thermoplastic polyurethane material includes soft segments formed of a polymeric polyol (polymeric glycol), a chain extender constituting hard segments, and a diisocyanate. No particular limitation is imposed on the polymeric polyol serving as a raw material, and the polymeric polyol may be any one selected from polymeric polyols which are conventionally employed in the technical field related to thermoplastic polyurethane materials. Examples of the polymeric polyol include polyester polyols and polyether polyols. Of these, polyether polyols are more preferred to polyester polyols, since a thermoplastic polyurethane material having high restitution elastic modulus and exhibiting excellent low-temperature properties can be synthesized. Examples of the polyether polyols include polytetramethylene glycol and polypropylene glycol. From the viewpoints of restitution elastic modulus and low-temperature properties, polytetramethylene glycol is particularly preferred. The average molecular weight of the polymeric polyol is preferably 1,000 to 5,000. The average molecular weight is more preferably 2,000 to 4,000, in order to synthesize a thermoplastic polyurethane material having high restitution elastic modulus.

Any chain extender which is conventionally employed in the technical field related to thermoplastic polyurethane materials is preferably used. Examples of the chain extender include, but are not limited to, 1,4-butylene glycol, 1,2-ethylene glycol, 1,3-butanediol, 1,6-hexanediol, and 2,2-dimethyl-1,3-propanediol. The average molecular weight of the chain extender is preferably 20 to 15,000.

Any diisocyanate which is conventionally employed in the technical field related to thermoplastic polyurethane materials is preferably used. Examples of the diisocyanate include, but are not limited to, aromatic diisocyanates such as 4,4'-diphenylmethane diisocyanate, 2,4-toluene diisocyanate, and 2,6-toluene diisocyanate; and aliphatic diisocyanates such as hexamethylene diisocyanate. In the present invention, 4,4'-diphenylmethane diisocyanate, which is an aromatic diisocyanate, is most preferred.

Preferred examples of the thermoplastic polyurethane material containing the aforementioned materials include commercially available polyurethane materials, such as Pandex T-8290, T-8295, and T-8260 (products of DIC Bayer Polymer Ltd.), and Resamine 2593 and 2597 (products of Dainichiseika Color & Chemicals Mfg. Co., Ltd.).

The cover material of the golf ball of the present invention predominantly contains the aforementioned thermoplastic polyurethane material and contains, as a dispersant, either or both of a fatty acid amide and a montan wax. The dispersant is added to the cover material in order to improve the dispersibility of a coloring agent and the mold releasability of a molded product. Having numerous dimples on its surface, the golf ball is very difficult to release from a mold after injection molding of the cover. Since the thermoplastic polyurethane material exhibits poor releasability, the dispersant must be appropriately incorporated into the polyurethane material. Some dispersants lower the heat resistance of the thermoplastic polyurethane material considerably, and thus the dispersant incorporated into the polyurethane material must be selected with great care.

Fatty acid amides employed in the present invention are classified into alkylene bis(fatty acid amides) and fatty acid amides. Examples of the alkylene bis(fatty acid amides) serving as a dispersant include ethylene bis(stearamide). The fatty acid amide is a chemically neutral and stable compound, and has a long chain alkyl group and a highly polar amide group in the molecule. The fatty acid amide forms hydrogen bonding between a hydrogen atom of the amide group and an oxygen atom of another molecule, to thereby form a chain polymer or a network polymer, and exhibits unique properties. Examples of the fatty acid serving as a dispersant include C8–C22 saturated fatty acid amides, unsaturated fatty acid amides, hydroxy fatty acid amides, N-methylol fatty acid amides, N,N'-methylene fatty acid amides, and N,N'-ethylene fatty acid amides. No particular limitation is imposed on the fatty acid amide employed in the present invention, but ethylene bis(stearamide) is preferred in consideration of balance between performance and cost. Examples of the commercially available ethylene bis(stearamide) include Kao Wax EB-P, EB-FF and EB-G (products of Kao Corporation).

Montan wax is obtained from brown coal through extraction. Montan wax is classified into a hard wax group including acid wax, ester wax, and partially saponified ester wax, and a soft wax group including montan soft wax. No particular limitation is imposed on the montan wax employed in the present invention, but a montanic acid ester is preferred, from the viewpoint of compatibility with the thermoplastic polyurethane material. Examples of the commercially available montanic acid ester include Hoechst Wax S, E, OP, and BJ (products of Hoechst).

In the present invention, polyethylene wax having an average molecular weight of 1,000 to 10,000 may be employed as a dispersant in combination with the aforementioned fatty acid amide and/or montan wax. The polyethylene wax, which is a polyethylene of low molecular weight, is classified into the following types in accordance with density: high density type (density: at least 0.96), middle density type (density: 0.94 to 0.95), and low density type (density: 0.93 or less). The average molecular weight of the polyethylene wax employed in the present invention is preferably 1,000 to 10,000, more preferably 1,500 to 6,000. Examples of the commercially available polyethylene wax include Sanwax 131P, 161P, 171P, and LEL-800 (products of Sanyo Chemical Industries, Ltd.).

In the present invention, the ratio of the thermoplastic polyurethane material to the dispersants; i.e., the ratio by weight of the thermoplastic polyurethane material to the total amount of the fatty acid amide and the montan wax, or the ratio by weight of the thermoplastic polyurethane material to the total amount of the fatty acid amide, the montan wax, and the polyethylene wax, is preferably 100:0.2 to 100:3, more preferably 100:1 to 100:3. When the amount of the dispersants is excessively low, sufficient improvement of the dispersibility of a coloring agent or the mold releasability of a molded product may fail to be attained. In contrast, when the amount of the dispersants is excessively high, adhesion of a coating or a stamp to the resultant cover may be lowered.

When the fatty acid amide and/or the montan wax are employed as dispersants, or when the fatty acid amide and/or the montan wax, and the polyethylene wax are employed as dispersants, no particular limitation is imposed on the proportions of these dispersants. However, since bleeding of the fatty acid amide occurs easily, the amount of the fatty acid amide is preferably reduced.

Examples of the incorporation method of the dispersants include, but are not limited to, a method in which the dispersants and a resin coloring agent are kneaded with the thermoplastic polyurethane material under heating; a method in which the dispersants are deposited onto the surface of the thermoplastic polyurethane material which has been colored; and a method in which the dispersants are heated and kneaded in advance with a master batch of a resin coloring agent.

In the present invention, the cover-forming material may contain other components in addition to the aforementioned components. Examples of such "other components" include thermoplastic polymer materials other than the thermoplastic polyurethane material, such as polyester elastomer, polyamide elastomer, ionomer resin, styrene block elastomer, polyethylene, and nylon resin. In this case, the incorporation amount of thermoplastic polymer materials other than the thermoplastic polyurethane material is 0 to 100 parts by weight, preferably 10 to 75 parts by weight, more preferably 10 to 50 parts by weight, on the basis of 100 parts by weight of the thermoplastic polyurethane material which serves as an essential component. The incorporation amount is appropriately determined in accordance with various purposes, including regulation of the hardness of the cover-forming material and improvement of the restitution, fluidity, and adhesion of the cover-forming material. If desired, the cover-forming material may further contain various additives, such as pigments, dispersants, antioxidants, light-resistant stabilizers, UV absorbers, and release agents.

In the golf ball of the present invention, the surface hardness of the cover-forming material is preferably 40 to 80, more preferably 43 to 60, much more preferably 45 to 55, as measured by use of a D-type durometer in accordance with JIS-K6253. When the surface hardness of the cover-forming material is excessively low, the resultant golf ball tends to produce excessive back-spin upon being hit with an iron; i.e., controllability of the golf ball is impaired. In contrast, when the surface hardness of the cover-forming material is excessively high, the resultant golf ball tends to produce insufficient back-spin upon being hit with an iron; i.e., controllability of the golf ball is lowered, and feeling on impact is impaired.

In the golf ball of the present invention, the restitution elastic modulus of the cover-forming material is preferably at least 45%, more preferably 45 to 85%, further preferably 50 to 80%, much more preferably 50 to 60%, as specified by JIS-K7311. Since the thermoplastic polyurethane material does not exhibit high restitution, preferably, the restitution elastic modulus is strictly selected. When the restitution elastic modulus of the cover-forming material is excessively low, the total distance of the golf ball is considerably lowered. In contrast, when the restitution elastic modulus of the cover-forming material is excessively high, the initial velocity of the golf ball becomes excessively high when being shot or putted (i.e., when controllability of the golf is required within the range of a total distance of 100 yards or less), and the golf ball may fail to meet a golfer's demand.

No particular limitation is imposed on the core employed in the golf ball of the present invention, and any type of cores that are usually employed can be employed. Examples of the core which may be employed include a solid core for a two-piece ball, a solid core having a plurality of vulcanized rubber layers, a solid core having a plurality of resin layers, and a thread-wound core having a thread rubber layer. No particular limitation is imposed on the outer diameter, weight, hardness, and material of the core. The thickness of the golf ball cover of the present invention preferably falls within a range of 0.1 to 5.0 mm. The cover may have a multi-layer structure, so long as the overall thickness of the cover falls within the above range.

The golf ball of the present invention is formed so as to have a diameter and a weight as specified under the Rules of Golf approved by R&A. Typically, the diameter is at least 42.67 mm, and the weight is 45.93 g or less. The diameter is preferably 42.67 to 42.9 mm. The deformation amount of the golf ball under application of a load of 980 N (100 kg) is preferably 2.0 to 4.0 mm, more preferably 2.2 to 3.8 mm.

EXAMPLES

The present invention will next be described in detail by way of Examples, which should not be construed as limiting the invention thereto.

Examples and Comparative Examples

| Core composition | |
|---|---|
| Polybutadiene rubber | 100 parts by weight |
| Zinc acrylate | 21.5 parts by weight |
| Zinc oxide | 12 parts by weight |
| Dicumyl peroxide | 1 part by weight |

The components of the aforementioned core composition were kneaded, and then subjected to vulcanization and forming at 155° C. for 20 minutes, to thereby obtain a solid core for a two-piece solid golf ball (diameter: 38.5 mm). BR01 (product of Japan Synthetic Rubber Co., Ltd.) was employed as the polybutadiene rubber. The specific gravity of the thus-obtained core was 1.07; the deformation amount under application of a load of 980 N (100 kg) was 3.4 mm; and the initial velocity as measured by means of a method specified by USGA (R&A) was 78.1 m/s.

Cover materials shown in Tables 1 and 2 (unit: part(s) by weight) were kneaded by use of a twin-screw extruder at 190° C., to thereby obtain cover-forming materials. Components shown in Tables 1 and 2 are described below.
Polyurethane 1 (Thermoplastic Polyurethane Material)
    Pandex T8290: MDI-PTMG-type thermoplastic polyurethane material (product of DIC Bayer Polymer Ltd.) (JIS A surface hardness: 93, restitution elastic modulus: 52%)
Polyurethane 2 (Thermoplastic Polyurethane Material)
    Pandex T8295: MDI-PTMG-type thermoplastic polyurethane material (product of DIC Bayer Polymer Ltd.) (JIS A surface hardness: 97, restitution elastic modulus: 44%)
Fatty Acid Amide
    Kao Wax EB: ethylene bis(stearamide) (product of Kao Corporation)
Montan Wax
    Hoechst Wax E: montanic acid ester (product of Hoechst)
Polyethylene Wax
    Polyethylene wax having an average molecular weight of 5,000.

Subsequently, each of the aforementioned solid cores was placed in a mold for injection molding, and a cover (thickness: 2.1 mm) was formed from each of the cover materials around the core by means of injection molding, to thereby produce a two-piece golf ball (Examples and Comparative Examples). The resultant golf ball was allowed to stand at room temperature for one week, and then properties of the golf ball were evaluated. The evaluation methods are described below. A sheet (thickness: 2 mm) formed through injection molding was allowed to stand at room temperature for one week, and then subjected to measurement of cover properties. Furthermore, the pigment dispersibility, mold releasability, coating adhesion, and heat resistance of the golf ball cover were evaluated. The results are shown in Tables 1 and 2.
(Cover Properties)
Surface Hardness
    The surface hardness of the cover was measured by use of a D-type durometer in accordance with JIS-K6253.
Restitution Elastic Modulus
    The restitution elastic modulus of the cover was measured in accordance with JIS-K7311.
(Ball Properties)
Hardness
    The deformation amount of the golf ball under application of a load of 980 N (100 kg) was measured.

Initial Velocity

The initial velocity of the golf ball was measured by means of a method specified by USGA (R&A).

Total Distance

The golf ball was hit at a head speed of 45 m/s by use of No. 1 wood (a driver) mounted on a swing robot machine, to thereby measure a total distance.

(Pigment Dispersibility)

A virgin resin was formed into a sheet (thickness: 1 mm) through pressing under heating at 210° C. Uniformity in dispersion of a coloring agent (particularly a bluing agent) was visually evaluated on the basis of the following criteria.

Good: The sheet is uniformly colored.

Poor: Marble-like patterns are observed here and there.

(Mold Releasability)

Upon removal from a mold, the golf ball was observed so as to determine whether or not a mark corresponding to a knock-out pin had been formed. Mold releasability was evaluated on the basis of the following criteria.

Good: The golf ball has no mark, or, although the ball has a slight amount of mark, the mark is negligible when observed after coating of the ball.

Poor: The golf ball has a conspicuous pin mark, and the pin mark is not negligible when observed after coating of the ball.

(Coating Adhesion)

After molding, the golf ball was subjected to coating treatment by means of a typical process, and then allowed to stand for one week. Thereafter, the resultant golf ball was subjected to wear testing for two hours in a mixture of sand and water contained in a roll mill, and the degree of exfoliation of the surface coating was observed. Coating adhesion was evaluated on the basis of the following criteria.

Good: No exfoliation of the coating, or substantially no exfoliation of the coating was observed.

Poor: Exfoliation of the coating was observed at some portions of the golf ball.

(Heat Resistance of Cover)

The thermal decomposition temperature of the cover was measured by means of a TG-DTA method (atmosphere: nitrogen, temperature increasing rate: 15° C./second) by use of Thermoplus TG8120 (product of Rigaku). The higher the thermal decomposition temperature, the more excellent the heat resistance.

TABLE 1

|  | Cover material | Ex. 1 | Ex. 2 | Ex. 3 | Ex. 4 | Ex. 5 |
|---|---|---|---|---|---|---|
| Resin | Polyurethane 1 |  |  | 50 | 50 | 100 |
|  | Polyurethane 2 | 100 | 100 | 50 | 50 |  |
| Pigment | Titanium oxide | 3 | 3 | 3 | 3 | 3 |
|  | Ultramarine | 0.4 | 0.4 | 0.4 | 0.4 | 0.4 |
| Dispersant | Fatty acid amide | 0.0 | 0.2 | 0.2 | 0.6 | 0.6 |
|  | Montan wax | 1.0 | 0.8 | 0.8 | 0.8 | 0.8 |
|  | Polyethylene wax | 1.0 | 1.5 | 1.5 | 0.0 | 1.5 |
| Cover | Surface hardness | 47 | 47 | 45 | 45 | 53 |
| properties | Restitution elastic modulus (%) | 45 | 45 | 50 | 50 | 46 |
| Ball | Outer diameter (mm) | 42.7 | 42.7 | 42.7 | 42.7 | 42.7 |
| properties | Weight (g) | 45.1 | 45.1 | 45.1 | 45.1 | 45.2 |
|  | Hardness (mm) | 3.2 | 3.2 | 3.0 | 3.0 | 2.8 |
|  | Initial velocity (m/s) | 76.7 | 76.7 | 76.7 | 76.7 | 76.8 |
|  | Total distance (m) | 224 | 224 | 222 | 222 | 223 |
| Pigment dispersibility |  | Good | Good | Good | Good | Good |
| Die releasability |  | Good | Good | Good | Good | Good |
| Coating adhesion |  | Good | Good | Good | Good | Good |
| Cover heat resistance (° C.) |  | 330 | 330 | 330 | 330 | 330 |

TABLE 2

|  | Cover material | Comp. Ex. 1 | Comp. Ex. 2 | Comp. Ex. 3 | Comp. Ex. 4 | Comp. Ex. 5 |
|---|---|---|---|---|---|---|
| Resin | Polyurethane 1 |  |  | 50 | 50 | 100 |
|  | Polyurethane 2 | 100 | 100 | 50 | 50 |  |
| Pigment | Titanium oxide | 3 | 3 | 3 | 3 | 3 |
|  | Ultramarine | 0.4 | 0.4 | 0.4 | 0.4 | 0.4 |
| Dispersant | Fatty acid amide |  |  |  |  | 1.6 |
|  | Montan wax |  |  |  |  | 1.6 |
|  | Polyethylene wax |  | 0.5 |  | 0.5 |  |
|  | Magnesium stearate | 0.3 |  | 0.3 |  |  |
| Cover | Surface hardness | 47 | 47 | 45 | 45 | 53 |
| properties | Restitution elastic modulus (%) | 45 | 45 | 50 | 50 | 46 |
| Ball | Outer diameter (mm) | 42.7 | 42.7 | 42.7 | 42.7 | 42.7 |
| properties | Weight (g) | 45.1 | 45.1 | 45.1 | 45.1 | 45.2 |
|  | Hardness (mm) | 3.2 | 3.2 | 3.0 | 3.0 | 2.8 |
|  | Initial velocity (m/s) | 76.7 | 76.7 | 76.7 | 76.7 | 76.8 |
|  | Total distance (m) | 224 | 224 | 222 | 222 | 223 |
| Pigment dispersibility |  | Good | Poor | Good | Poor | Good |
| Die releasability |  | Good | Poor | Good | Poor | Good |
| Coating adhesion |  | Good | Good | Good | Good | Poor |
| Cover heat resistance (° C.) |  | 290 | 330 | 290 | 330 | 330 |

As is clear from Tables 1 and 2, all the golf ball covers of the Examples of the present invention exhibit good pigment (coloring agent) dispersibility during coloring, and exhibit excellent mold releasability and coating adhesion. In contrast, all of the golf ball covers of the Comparative Examples—which were not produced from the cover material of the present invention—exhibit poor pigment dispersibility, mold releasability, or coating adhesion. In Comparative Examples 1 and 3, since the heat resistance of the thermoplastic polyurethane material was lowered, discoloration of the molded product was observed.

As described above, the cover of the golf ball of the present invention exhibits excellent mold releasability upon molding. In addition, the cover of the golf ball exhibits excellent pigment dispersibility during coloring and excellent coating adhesion after molding.

What is claimed is:

1. A golf ball comprising a core and a cover therefor, wherein the cover is formed from a cover material consisting of a thermoplastic polyurethane material as a primary component and a fatty acid amide, a montan wax and a polyethylene wax having an average molecular weight of 1,000 to 10,000 as dispersants; the ratio by weight of the thermoplastic polyurethane material to the total amount of the fatty acid amide, the montan wax, and the polyethylene wax is 100:0.2 to 100:3.0.

2. A golf ball according to claim 1, wherein the fatty acid amide is an alkylene bis(fatty acid amide).

3. A golf ball according to claim 2, wherein the fatty acid amide is ethylene bis(stearamide).

4. A golf ball according to claim 1, wherein the montan wax is a montanic acid ester.

* * * * *